US005208502A

United States Patent [19]

Yamashita et al.

[11] Patent Number: 5,208,502

[45] Date of Patent: May 4, 1993

[54] SLIDING CURRENT COLLECTOR MADE OF CERAMICS

[75] Inventors: Nobuyuki Yamashita; Kazuo Tahara; Akio Chiba, all of Hitachi; Masahisa Sobue, Mito; Toshimi Abukawa, Hitachiota; Shin'ichi Sakamoto, Hitachi; Shun Suzuki, Katsuta, all of Japan

[73] Assignees: Hitachi, Ltd.; Hitachi Koki Co., Ltd., Tokyo, Japan

[21] Appl. No.: 842,484

[22] Filed: Feb. 27, 1992

[30] Foreign Application Priority Data

Feb. 28, 1991 [JP] Japan .................................. 3-055685

[51] Int. Cl.[5] .............................................. H02K 13/00

[52] U.S. Cl. ...................................... 310/219; 310/42; 310/43; 310/45; 310/234

[58] Field of Search ................. 310/45, 219, 232, 233, 310/234, 235, 236, 237, 43, 44, 42; 29/597

[56] References Cited

U.S. PATENT DOCUMENTS 3,766,634 10/1973 Babcock ............................ 228/188
3,777,367 12/1973 Kalagidis .......................... 310/233
3,911,553 10/1975 Burgess ............................ 228/903
4,035,908 7/1977 Ishi ....................................... 29/597
4,603,474 8/1984 Gobrech ........................... 310/233
4,618,793 10/1986 Shizuka ............................ 310/232
4,667,394 5/1987 Bode .................................. 310/236
4,833,769 5/1989 Tomite ............................... 310/235
4,845,395 7/1989 Bost .................................... 310/233
4,890,026 12/1989 Isozumi ............................. 310/233

FOREIGN PATENT DOCUMENTS 60-39338 3/1985 Japan .

OTHER PUBLICATIONS

Elementary Ceramics Science, May 10, 1984, (with translation), Agun Kabumhiki Kaisha Co., Japan.

*Primary Examiner*—R. Skudy
*Attorney, Agent, or Firm*—Evenson, McKeown, Edwards & Lenahan

[57] ABSTRACT

Ceramics material are not resistant to tensile force, though they are resistant to compression force. Therefore, ceramics materials, when used as the material of a commutator of an electric rotary machine, tends to be cracked and broken due to tensile stress generated in the inner peripheral portion of the commutator when the latter is press-fitted on the rotor shaft of the machine. The invention is aimed at obviating the above-described problem, so as to make it possible to produce a sliding current collector of an electric rotary machine from a ceramics material. To this end, according to the invention, an annular gap is formed between the inner peripheral surface of the ceramics commutator and the other peripheral surface of the rotary shaft and the gap is filled with a resin such as a thermosetting resin which is then thermally set to form a resin layer by which the commutator is bonded to the rotor shaft. The resin layer effectively absorbs any tensile stress which may otherwise be caused in the inner peripheral portion of the commutator due to, for example, thermal expansion of the rotor shaft. It is thus possible to securely fix the commutator to the rotor shaft without risk of cracking or damaging of the commutator.

8 Claims, 3 Drawing Sheets

SLIDING CURRENT COLLECTOR MADE OF CERAMICS

BACKGROUND OF THE INVENTION

1. Field of the Invention

The present invention relates to a sliding current collector such as a slip ring, commutator or the like which is made of a composite ceramics material and which is used in electric rotary machines such as commutator-type motors and generators. More particularly, the present invention is concerned with a sliding current collector which is made of a composite ceramics material and which is suitable for use in comparatively small electric motors such as an automotive engine starter motor, a motor for use in a portable motor-driven tool, and so forth.

2. Description of the Related Arts

Nowadays, various types of ceramics materials have been developed and used, including insulating ceramics which exhibit high insulation power well comparing with that of conventional insulators, as well as electrically conductive ceramics which exhibit electrical conductivity substantially the same as that of iron. Composite ceramics bodies also have been developed which are composed of highly insulating and highly conductive ceramics materials sintered into one body. Because of excellent mechanical strength and heat resistance, the composite ceramics bodies exhibit high resistances both to wear and sparking as compared with conventional materials such as carbon and copper and, hence, are expected to offer superior results when used as the material of a sliding current collector such as a slip ring or a commutator of an electric rotary machine.

An example of the sliding current collector made of a composite ceramics body is disclosed in Japanese Patent Laid-Open Publication No. 60-39338.

Unfortunately, however, no specific consideration or proposal has been given for the means for fixing a sliding current collector made of ceramics material to the shaft of an electric rotary machine. Conventionally, fixing of a sliding current collector to a shaft has relied upon press-fit or shrink fit. If such a conventional fixing method is used for fixing a sliding current collector made of a ceramics material, the collector becomes practically unusable due to cracking or destruction because of small tensile strength inherent to ceramics materials.

In order to prevent any excessive tensile stress from being generated in sliding current collector such as a slip ring or commutator ring made of ceramics material, it has been proposed to fix the collector by axially pressing it by means of a nut, while increasing the tolerance between the inside diameter of the slip ring or commutator ring and the outside diameter of the rotary shaft. This method, however, poses a new problem in that the axial pressing force for fixing the electrical collector is reduced due to axial elongation of the rotary shaft, with the result that the current collector is moved or offset on the rotary shaft, thus making it difficult to correctly position and hold the current collector.

These problems encountered with conventional arts will be described in more detail.

The use of a compound ceramics body as the material of a slip ring or a commutator ring of an electric rotary machine essentially requires means for correctly positioning the slip ring or the commutator ring on the rotary shaft of the machine both in radial and rotational directions, as well as means for preventing the ring from rotating relative to the rotary shaft.

In general, following methods have been used for the purpose of fixing a sliding current collector to a rotary shaft of an electric rotary machine:

(1) To fix the sliding current collector to the rotary shaft by means of a key.

(2) To decrease the tolerance between the sliding current collector and the rotary shaft to enable fixing by a shrink or press-fit.

(3) To press-fit the sliding current collector on knurled surface of the rotary shaft.

(4) To deposit a resin or the like material on and around the ends of the sliding current collector on the rotary shaft and to cure the same thereby fixing the collector.

As explained in, for example, ELEMENTARY CERAMIC SCIENCE, pp 113–142, published by Agune Kabushiki Kaisha, the ceramics materials generally exhibit only low levels of tensile strength, although the levels of compression strength are considerably high. The conventional methods (1) to (3) mentioned above, therefore, are not suitably used for ceramics current collectors because such collectors are easily broken due to cracking caused by tensile stress generated in the ring-shaped sliding current collector.

The known method (4) mentioned above also is inadequate in that the sliding current collector cannot be precisely located and centered because it is fixed by means of the resin which is deposited to and around the ends of the current collector.

In order to obviate such problems inherent in the conventional method, it is necessary to employ a greater tolerance between the outside diameter of the rotary shaft and the inside diameter of the cylindrical ceramics sliding current collector so as to avoid any tensile stress which may otherwise be applied to the inner peripheral portion of the sliding current collector.

However, unduly large tolerance between the outside diameter of the rotary shaft and the inside diameter of the cylindrical ceramics sliding current collector undesirably allows the sliding current collector to play or rotate relative to the rotary shaft due to the resistance torque imposed on the collector, thus posing another problem.

In order to ensure that intended performance of the machine is obtained and that electrical connection between the commutator riser and the rotor core coils is facilitated, it is necessary that the coil grooves in the rotor core and the riser grooves in the commutator have to be located at the same angular position as viewed in the direction of rotation. This requirement, however, cannot be satisfactorily met by known methods (1) to (4) because of difficulty encountered in precisely locating and fixing the cylindrical ceramics sliding current collector. Namely, with these known methods, it is not easy to connect the coils of the rotor to the commutator risers. The same problem is encountered also by the aforesaid known method (4). It is therefore necessary to take a suitable measure for overcoming these problems of the known arts.

SUMMARY OF THE INVENTION

Accordingly, an object of the present invention is to provide a sliding current collector made of a ceramics material which can be mounted on and fixed to a rotary shaft without any angular and axial positional slippage and without suffering from cracking and other damages.

To this end, according to the present invention, there is provided a sliding current collector which is fixed to a rotary shaft through, at least, a resin layer.

According to the invention, a predetermined annular gap is preserved between the inner peripheral surface of the ceramics sliding current collector and the outer peripheral surface of the rotary shaft and the gap is filled with a resin followed by setting or curing of the resin, whereby the above-mentioned resin layer is formed so as to fix the ceramics sliding current collector to the rotary shaft. This resin layer also is effective in absorbing any stress which may otherwise be transmitted from the rotary shaft to the ceramics sliding current collector.

Consequently, generation of excessively large stress in the ceramics sliding current collector is avoided, which improves reliability of the ceramics sliding current collector. Axial positioning and centering of the ceramics sliding current collector with respect to the rotary shaft can be performed accurately by the use of a resin casting mold which is prepared beforehand or the use of suitable locating members placed in the above-mentioned annular gap, thus ensuring a high dimensional precision.

DESCRIPTION OF THE PREFERRED EMBODIMENTS

Preferred embodiments of the ceramics sliding current collector of the present invention will be described hereinunder with reference to the accompanying drawings.

Figure 2:
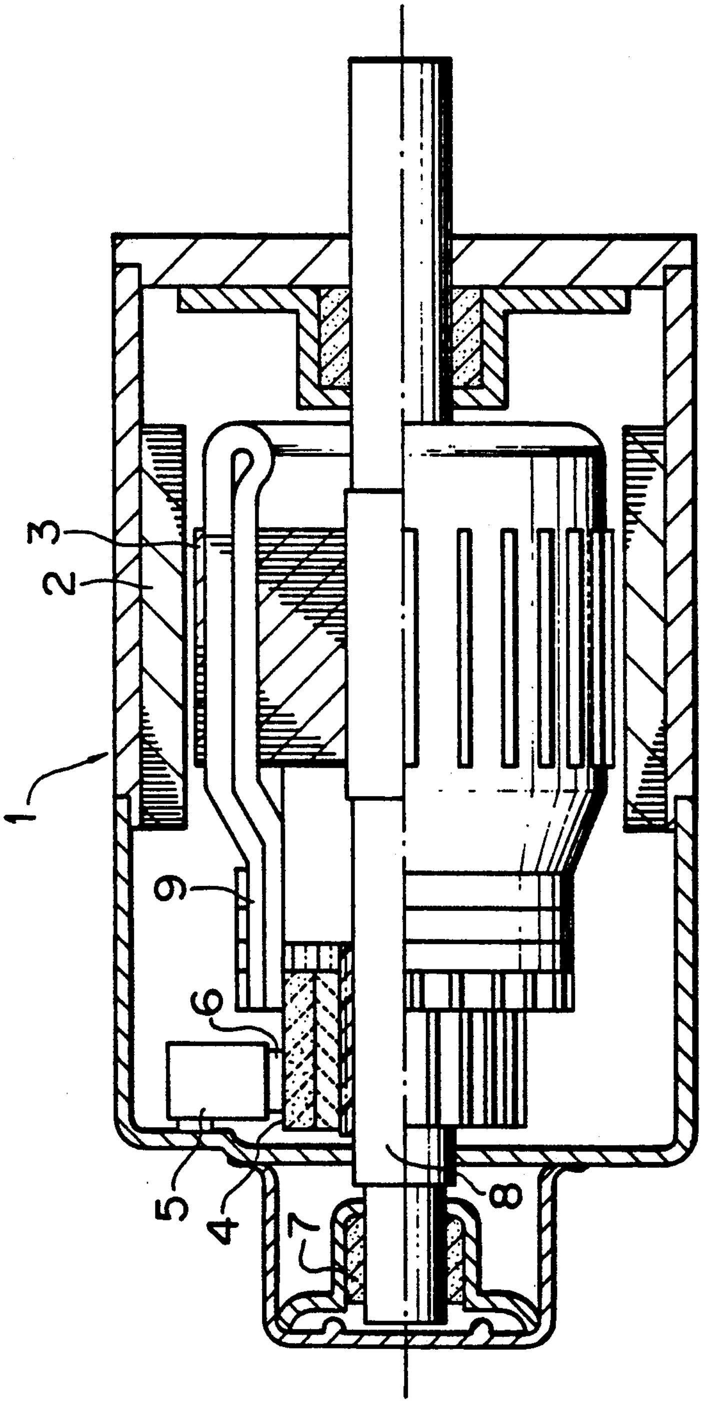
FIG. 2 is a sectional view of a motor as an example of an electric rotary machine which incorporates the ceramics sliding current collector of the present invention.

FIG. 2 shows a D.C. motor used as a starter motor, as an example of the electric rotary machine which incorporates an embodiment of the ceramics sliding current collector in accordance with the present invention. The motor generally denoted by 1 has a stator 2 serving as a field generator, a rotor 3, a commutator 4, a brush holder 5, brushes 6, bearings 7, a shaft 8, rotor coils 9, and so forth, as known per se. The commutator 4 is a ceramics commutator as an embodiment of the ceramics sliding current collector of the present invention.

Figure 1A:
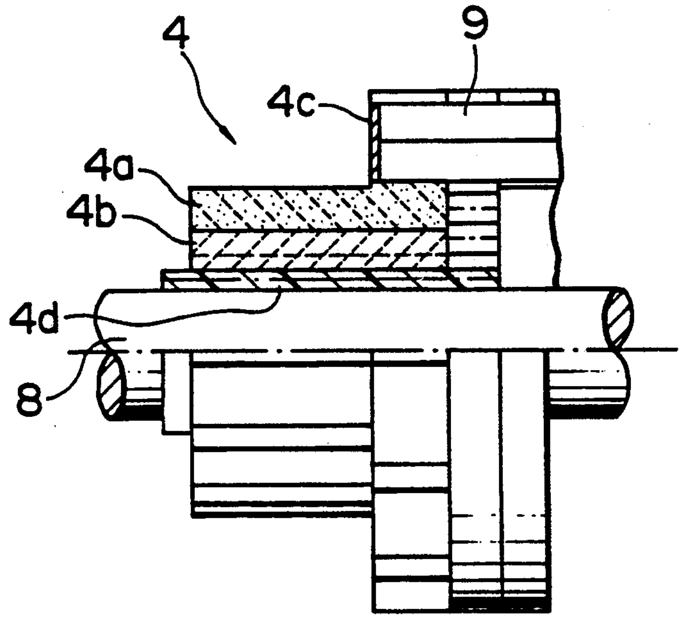
FIG. 1A is a partly-sectioned side elevational view of a commutator as an embodiment of the ceramics sliding current collector of the present invention.
Figure 1B:
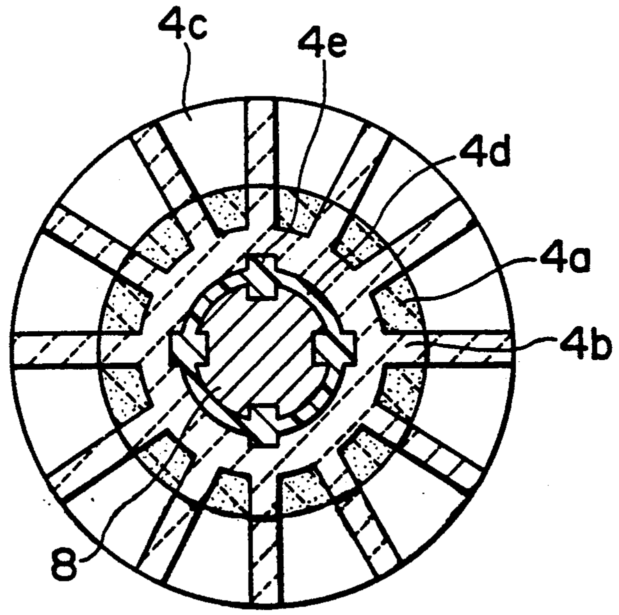
FIG. 1B is a front elevational view of the commutator as viewed in the direction of the axis of the commutator.

Referring to FIG. 1A which shows the detail of the commutator 4 in partly-sectioned side elevational view, as well as to FIG. 1B which is a front elevational view, the ceramics commutator 4 is a ceramics composite body composed of a conductive portion **4*a* made of a conductive ceramics material, an insulating portion 4*b* made of an insulating material, and an extension 4*c* of the conductive portion 4*a*. Armature coils 9 are connected to the extension 4*c* of the conductive portion 4*a***.

Numeral **4*d* denotes a resin layer. The ceramics commutator 4 has a substantially cylindrical bore which receives a shaft 8. The diameter of the cylindrical bore in the ceramics commutator 4 has a diameter which is greater by a predetermined amount than the outside diameter of the shaft 8 so that a predetermined annular gap is formed between the inner peripheral surface of the ceramics commutator 4 and the outer peripheral surface of the shaft 8. A resin is charged in this gap and then set or cured to form the above-mentioned resin layer 4*d***.

Any thermosetting resin ordinarily used in rotary electric machines, such as a phenol resin or an epoxy resin, can be used as the material of the resin layer **4*d***. Thermosetting resins which are used nowadays specifically for commutators can be used most suitably.

The size of the annular gap between the ceramics commutator 4 and the shaft 8 can be set to any desired value provided that the gap is large enough to be filled with the resin. More specifically, the size of the gap is determined in consideration of various factors such as the fluidity of the resin at the time of filling and filling method such as vacuum filling or other method. Practically, however, the size ranges from 0.05 to 1.0 mm.

According to this arrangement, the ceramics commutator 4 is fixed to the shaft 8 through the intermediary of the resin layer **4*d*, i.e., through the bonding force given by the resin layer 4*d*. Any stress which is generated, for example, by thermal expansion of the shaft 8 can be well absorbed by deformation of the resin layer 4*d*. Consequently, generation of tensile stress which hitherto has been inevitable in conventional commutator can be avoided, whereby cracking and other damaging of the ceramics commutator 4** are avoided, thus ensuring sufficient reliability of the ceramics commutator.

Furthermore, according to this embodiment, the ceramics commutator 4 can be fixed to the shaft 8 simply by the provision of the resin layer **4*d***. This work is very easy to conduct and required strength can easily be developed thanks to the use of a thermosetting resin such as a phenol resin or an epoxy resin. In addition, cost of production can be reduced appreciably.

The object of the invention can be well achieved merely by filing the annular gap with the resin and setting the resin into the resin layer **4*d*. In some cases, however, a specifically large bonding strength may be required. In such a case, the arrangement may be such that both the inner peripheral surface of the ceramics commutator 4 and the outer peripheral surface of the shaft 8 are provided with grooves so that protrusions 4*e* may be formed on the resin layer 4*d* so as to bite in the grooves. According to this arrangement, the area of bonding between the resin layer 4*d* and the surfaces of the ceramics commutator 4 and the shaft 8** is increased so as to enhance the bonding strength.

The protrusions **4*e*** may have a rectangular form as illustrated or may be round or spiral. Any suitable configuration can be adopted provided that it facilitates the work and increases the area of bonding.

The embodiment employing the protrusions **4*e* offers an additional advantage in that it facilitates positioning of the ceramics commutator 4 with respect to the shaft 8 in the rotational direction and enhances the precision of such positioning, when forming the resin layer 4*d* after insertion of the shaft 8** into the ceramics commutator 4, by virtue of the grooves which are formed in both members and which serve as indexing means.

It is also possible to place a pre-formed resin member or other member such as a metallic member in each of the grooves which are formed both in the inner peripheral surface of the ceramics commutator 4 and the outer peripheral surface of the shaft 8 and which are to be filled by the protrusions 4e of the resin layer 4d after setting of the resin. Such resin or metallic member provides a large anchoring effect and serves as a locating member which facilitates rotational indexing of the ceramics commutator 4 with respect to the shaft 8.

In the described embodiment, both the inner peripheral surface of the ceramics commutator 4 and the outer peripheral surface of the shaft 8 are provided with grooves and the grooves in both members are aligned in angular direction. This, however, is not exclusive. For example, the grooves may be formed only in one of the inner peripheral surface of the ceramics commutator 4 and the outer peripheral surface of the shaft 8 while the other surface is smooth. It is also possible to arrange such that the grooves formed in the inner peripheral surface of the ceramics commutator 4 and the grooves formed in the outer peripheral surface of the shaft 8 are staggered in the rotational direction. The arrangement also may be such that the grooves formed in the inner peripheral surface of the ceramics commutator 4 and the grooves formed in the outer peripheral surface of the shaft 8 have different configurations.

In each of these cases, charging of the resin of a high viscosity into the gap between the ceramics commutator 4 and the shaft 8 is conducted by charging the resin into the portions of the gap having greater crosssectional area so that the resin can smoothly move into and fill the narrow portions of the gap.

A description will now be given of another embodiment of the invention with specific reference to FIG. 3A.

In contrast to the embodiment shown in FIGS. 1A and 1B in which the ceramics commutator 4 is fixed to the shaft 8 only through the intermediary of the resin layer 4d, a ceramics commutator 4; as the second embodiment employs a metallic cylindrical member 10 which is disposed inside thereof so that an annular gap is formed between the outer peripheral surface of the metallic cylindrical member 10 and the inner peripheral surface of the ceramics commutator 4'. In this embodiment, a resin layer 4d is formed in this annular gap. This resin layer 4d is formed in the same method as that described before in connection with the first embodiment. Thus, a subassembly composed of the ceramics commutator 4', resin layer 4d and the cylindrical metallic member 10 is formed as an integral member which is separate from the shaft 8 of the motor (see FIG. 2) and this integral member is mounted on the shaft 8 as illustrated in FIG. 2. The first embodiment shown in FIGS. 1A and 1B essentially requires that the ceramics commutator 4 is correctly positioned and held with respect to the shaft 8 concentrically therewith during the period of charging of the thermoplastic resin for fixing the commutator 4; to the shaft 8. In the second embodiment, however, the ceramics commutator 4' is first fixed to the metallic cylindrical member 10 by means of the resin to form a sub-assembly and this sub-assembly is fixed to the shaft by a conventional method such as press-fitting with the aid of a key which engages with keyways formed both in the metallic cylindrical member 10 and the shaft 8. According to the second embodiment, therefore, it is not necessary to hold the ceramics commutator concentrically with respect to the shaft for a comparatively long period of charging and setting of the resin. Consequently, the production of the electric rotary machine can be considerably facilitated.

Figure 3A:
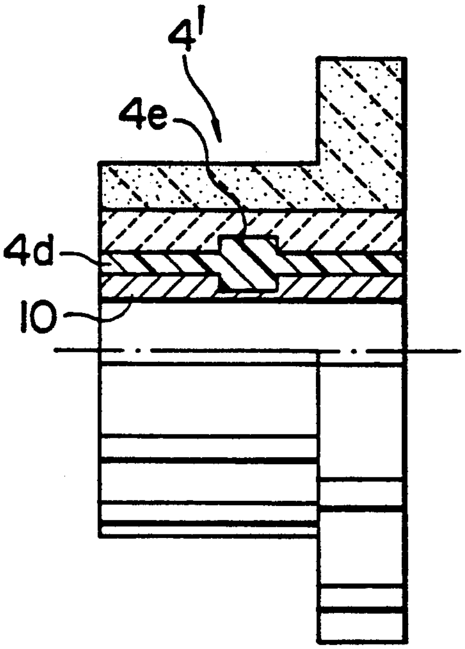
FIG. 3A is an illustration of another embodiment of the ceramics sliding current collector of the present invention.
Figure 3B:
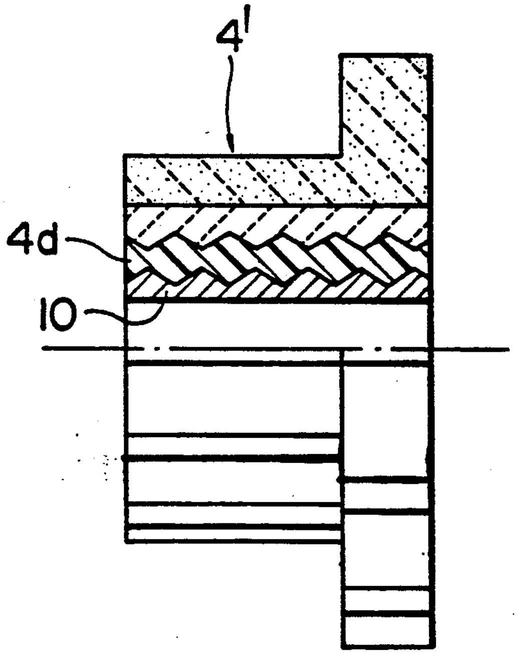
FIG. 3B is an illustration of further embodiment of the ceramics sliding current collector of the present invention.

FIG. 3B shows a modification which employs a different configuration of the protrusions 4e from that of the embodiment shown in FIG. 3A. Other portions are materially the same as those of the embodiment of FIG. 3A.

In the embodiment and modification shown in FIGS. 3A and 3B, the metallic cylindrical member 10 is fixed to the ceramics commutator 4' through the resin layer 4d, i.e., by the bonding force developed by the resin layer 4d. After the mounting of the sub-assembly on the shaft 8, any stress generated, for example, by a thermal expansion of the shaft 8 is absorbed by a deformation of the resin layer 4d, so that generation of tensile stress in the ceramics commutator 4; is avoided to prevent damaging of the commutator 4', thus improving the reliability of the same.

Needless to say, the embodiment and the modification shown in FIGS. 3A and 3B may be provided with axial grooves formed in the ceramics commutator 4' and/or the shaft 8 as in the case of the embodiment shown in FIGS. 1A and 1B, in order to facilitate the injection of the resin. In the cases of the embodiment and the modification shown in FIGS. 3A and 3B, however, only one such axial groove is sufficient, because the indexing of the commutator with respect to the shaft is unnecessary in these cases.

Although commutators have been specifically described as the preferred embodiments of the ceramics sliding current collector of the present invention, the invention can obviously be applied to slip rings of electric rotary machines and the same advantages are brought about from such application.

Thus, the present invention offers the following advantages by virtue of the structural features described hereinbefore.

Namely, the resin layer which is formed in the gap between the inner peripheral surface of the ceramics commutator and the outer peripheral surface of the shaft effectively absorbs any tensile force which is generated as a result of thermal expansion of the shaft and which may otherwise be applied to the inner peripheral portion of the ceramics commutator. Consequently, the ceramics commutator, which is inherently not resistant to tensile stress, is effectively protected. It is thus possible to obtain a ceramics sliding current collector which has a high reliability.

Furthermore, the present invention makes it possible to form an integral assembly including the shaft, ceramics commutator, coil and the core by means of a resin. This appreciably shorten the time required for the production of the electric rotary machine and to prevent any slippage of the ceramics commutator from the center of the shaft.

Axial grooves formed in the surfaces of the ceramics commutator and the shaft enables an easy and precise indexing of the commutator with respect to the coil slots in the rotor core, while preventing the ceramics commutator from rotating relative to the shaft.

What is claimed is:

1. A ceramics sliding current collector comprising a substantially cylindrical composite ceramics member having a conductive portion and an insulating portion which are formed integrally from a conductive ceramics material and an insulating ceramics material, said substantially cylindrical ceramics member having a bore which receives a rotary shaft having an outer peripheral surface with an outside diameter to which said substantially cylindrical composite ceramics member is fixed, said bore of said substantially cylindrical composite ceramics member having an inner diameter slightly greater than the outside diameter of said shaft so that a substantially annular gap is formed between said substantially cylindrical composite ceramics member and said shaft, said annular gap being filled with a resin layer which has been cured therein so as to bond said substantially cylindrical composite ceramics member to said rotary shaft.

2. A ceramics sliding current collector according to claim 1, wherein at least one groove is formed in at least one of inner peripheral surface of said ceramics member and the outer peripheral surface of said rotary shaft.

3. A ceramics sliding current collector according to claim 1, wherein protrusions and recesses are formed in at least one of inner peripheral surface of said ceramics member and the outer peripheral surface of said rotary shaft.

4. A ceramics sliding current collector according to claim 2, wherein grooves are formed both in the inner peripheral surface of said ceramics member and the outer peripheral surface of said rotary shaft, and said substantially cylindrical composite ceramics member being located with respect to said rotary shaft in the direction of rotation such that said grooves formed in the inner peripheral surface of said ceramics member align with said grooves in the outer peripheral surface of said rotary shaft.

5. A ceramics sliding current collector according to claim 3, wherein protrusions and recesses are formed both in the inner peripheral surface of said ceramics member and the outer peripheral surface of said rotary shaft to form grooves, and said substantially cylindrical composite ceramics member being located with respect to said rotary shaft in direction of rotation such that said grooves formed in the inner peripheral surface of said ceramics member aligned with said grooves in the outer peripheral surface of said rotary shaft.

6. A ceramics sliding current collector comprising a substantially cylindrical composite ceramics member having a conductive portion and an insulating portion which are formed integrally from a conductive ceramics material and an insulating ceramics material, said substantially cylindrical ceramics member having a bore with an inner diameter which receives a rotary shaft having an outer peripheral surface with an outside diameter to which said substantially cylindrical composite ceramics member is fixed, said bore receiving a metallic cylindrical member having an outside diameter smaller than the inner diameter of said bore of said substantially cylindrical composite ceramics member so that a substantially annular gap is formed between said substantially cylindrical composite ceramics member and said shaft, said annular gap being filled with a resin layer which has been cured therein so as to bond said substantially cylindrical composite ceramics member to said metallic cylindrical member thereby forming a sub-assembly, said sub-assembly being fixed to said rotary shaft in a press fit manner.

7. A ceramics sliding current collector according to claim 6, wherein at least one groove is formed in at least one of inner peripheral surface of said ceramics member and the outer peripheral surface of said metallic cylindrical member.

8. A ceramics sliding current collector according to claim 6, wherein protrusions and recesses are formed in at least one of inner peripheral surface of said ceramics member and the outer peripheral surface of said metallic cylindrical member.

* * * * *